(12) United States Patent
Hosotani

(10) Patent No.: US 9,478,992 B2
(45) Date of Patent: Oct. 25, 2016

(54) POWER TRANSMISSION SYSTEM

(71) Applicant: MURATA MANUFACTURING CO., LTD., Nagaokakyo-shi, Kyoto (JP)

(72) Inventor: Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 303 days.

(21) Appl. No.: 14/472,136

(22) Filed: Aug. 28, 2014

(65) Prior Publication Data

US 2014/0368056 A1    Dec. 18, 2014

Related U.S. Application Data

(63) Continuation of application No. PCT/JP2013/054255, filed on Feb. 21, 2013.

(30) Foreign Application Priority Data

Mar. 6, 2012    (JP) .................. 2012-049829

(51) Int. Cl.

| | | |
|---|---|---|
| *H02J 5/00* | (2016.01) | |
| *H01F 38/14* | (2006.01) | |
| *H02J 7/02* | (2016.01) | |
| *H04B 5/00* | (2006.01) | |
| *H01F 27/28* | (2006.01) | |

(52) U.S. Cl.
CPC .............. *H02J 5/005* (2013.01); *H01F 38/14* (2013.01); *H02J 7/025* (2013.01); *H04B 5/0037* (2013.01); *H04B 5/0075* (2013.01); *H01F 27/28* (2013.01)

(58) Field of Classification Search
None
See application file for complete search history.

(56) References Cited

U.S. PATENT DOCUMENTS

| | | | |
|---|---|---|---|
| 5,095,224 A | | 3/1992 | Renger |
| 6,040,986 A | * | 3/2000 | Sakamoto ............... H01F 38/14 363/21.02 |

(Continued)

FOREIGN PATENT DOCUMENTS

| | | |
|---|---|---|
| JP | 58-224559 A | 12/1983 |
| JP | 04-285436 A | 10/1992 |

(Continued)

OTHER PUBLICATIONS

An Office Action, "Notification of Preliminary Rejection" issued by the Korean Patent Office on May 17, 2016, which corresponds to Korean Patent Application No. 10-2014-7024951 and is related to U.S. Appl. No. 14/472,136; with English language translation.

(Continued)

*Primary Examiner* — Jared Fureman
*Assistant Examiner* — Aqeel Bukhari
(74) *Attorney, Agent, or Firm* — Studebaker & Brackett PC

(57) ABSTRACT

A power transmitting unit-side resonance circuit including a resonance capacitor connected in series to a power transmitting coil and a power receiving unit-side resonance circuit including a resonance capacitor connected in series to a power receiving coil are caused to resonate with each other so that each resonance circuit resonates. With this, power is transmitted between the power transmitting coil and the power receiving unit making use of magnetic field resonance coupling and electric field resonance coupling. By making use of resonance, only effective power is transmitted from the power transmitting unit side to the power receiving unit side, while reactive power that is reflected is reserved as resonance energy in each resonance circuit.

20 Claims, 14 Drawing Sheets

(56) References Cited

U.S. PATENT DOCUMENTS

| 2007/0252441 | A1 | 11/2007 | Yamauchi et al. |
| 2009/0302688 | A1 | 12/2009 | Boys |
| 2010/0148723 | A1 | 6/2010 | Cook et al. |
| 2011/0266884 | A1 | 11/2011 | Wako et al. |
| 2012/0169279 | A1 | 7/2012 | Kim |

FOREIGN PATENT DOCUMENTS

| JP | 2005-278400 A | 10/2005 |
| JP | 2006-074897 A | 3/2006 |
| JP | 2006-203032 A | 8/2006 |
| JP | 2006-230032 A | 8/2006 |
| JP | 2006-296054 A | 10/2006 |
| JP | 2006-304391 A | 11/2006 |
| JP | 2006-311742 A | 11/2006 |
| JP | 2008-206327 A | 9/2008 |
| JP | 2009-065726 A | 3/2009 |
| JP | 2009-539343 A | 11/2009 |
| JP | 2010-226890 A | 10/2010 |
| KR | 2011-0029358 A | 3/2011 |
| KR | 2011-0051272 A | 5/2011 |
| KR | 2011-0103408 A | 9/2011 |
| WO | 2006/022365 A1 | 3/2006 |

OTHER PUBLICATIONS

The European search report (under R.61 or R.63 EPC) issued by the European Patent Office on Nov. 9, 2015, which corresponds to European Patent Application No. 13758558.4-1804 and is related to U.S. Appl. No. 14/472,136.

International Search Report; PCT/JP2013/054255; May 21, 2013.

Written Opinion of the International Searching Authority; PCT/JP2013/054255; May 21, 2013.

* cited by examiner

POWER TRANSMISSION SYSTEM

CROSS REFERENCE TO RELATED APPLICATIONS

This application claims benefit of priority to Japanese Patent Application No. 2012-049829 filed on Mar. 6, 2012, and to International Patent Application No. PCT/JP2013/054255 filed on Feb. 21, 2013, the entire content of which is incorporated herein by reference.

TECHNICAL FIELD

The present disclosure relates to power transmission systems configured of power transmitting units and power receiving units.

BACKGROUND

Recently, reduction in size, weight, and power consumption of electronic apparatuses and increase in capacity of batteries have driven increase of battery-driven electronic apparatuses. Further, in a short distance, operation modes in which data communication is made by wireless between apparatuses are increasing. Under these circumstances, the noncontact transmission technique is also needed for power transmission of the apparatuses.

An existing noncontact charging system, as disclosed in Japanese Unexamined Patent Application Publication No. 2008-206327, for example, is configured of a power transmitting unit having a primary coil installed on a charging platform or the like and a mobile electronic apparatus having a secondary coil and a rechargeable battery. In the stated charging system, a user places the mobile electronic apparatus upon the power transmitting unit. Through this, the primary coil of the power transmitting unit and the secondary coil of the mobile electronic apparatus form electromagnetic induction coupling (magnetic field coupling) therebetween so as to supply power to the side of the apparatus to be charged, whereby the secondary battery is charged.

SUMMARY

Technical Problem

However, in the power transmission system disclosed in Japanese Unexamined Patent Application Publication No. 2008-206327, a power transmitting coil and a power receiving coil together act as an insulation transformer that makes use of electromagnetic induction, that is, the above coils are merely used as a transformer that makes use of magnetism coupling. In a transformer that makes use of electromagnetic induction, magnetic flux generated by a current that flows in a primary winding is made to interlink a secondary winding so as to flow a current therein; that is, it is essential to efficiently convert electricity to magnetism, and then convert the magnetism to electricity. In general, of the magnetic flux generated by a current that flows in the primary winding, a rate of the magnetic flux that interlinks the secondary winding is called a degree of (magnetic) coupling. In the transformer making use of electromagnetic induction, how to raise the degree of magnetic coupling is an important issue in order to improve the power conversion efficiency. However, in order to prevent magnetic saturation or because of physical limitations, it is often the case that the increase of the degree of magnetic coupling of a transformer is difficult to be realized. Consequently, high power conversion efficiency cannot be obtained.

In a general power transmission system, since the power is transmitted while making impedance matching, an operation frequency is changed in controlling the system. Meanwhile, in electronic apparatuses, a frequency range that can be used by each apparatus is defined. Therefore, considering EMC (electromagnetic compatibility), controllability of transmission energy, and so on, it is preferable to operate the system at a fixed frequency.

A goal of the present disclosure is to provide power transmission systems in which higher power conversion efficiency is obtained at a time of power transmission without making the system devices larger.

Solution to Problem

Power transmission systems of the present disclosure are configured as follows.

(1) In a power transmission system configured of a power transmitting unit having a power transmitting coil and a power receiving unit having a power receiving coil, the power transmitting unit includes: a power transmitting unit-side resonance capacitor that configures a power transmitting unit-side resonance circuit along with the power transmitting coil; and a power transmitting unit-side alternating current generation circuit that is electrically connected with the power transmitting coil, including a switching circuit configured of a parallel connection circuit in which a switching element, a diode, and a capacitor are connected in parallel, and an inductor having such a value of inductance that makes it possible to form a current source, from an inputted direct-current voltage, that can relatively be taken as a direct current in comparison with an alternating current that is flowed in the power transmitting coil, so as to generate the alternating current to be flowed in the power transmitting coil, the power receiving unit includes: a power receiving unit-side resonance capacitor that configures a power receiving unit-side resonance circuit along with the power receiving coil; and a power receiving unit-side rectification circuit that is connected with the power receiving coil and rectifies an alternating current generated on the power receiving coil, an electromagnetic field resonance coupling circuit is configured with mutual inductance and mutual capacitance that are equivalently formed between the power transmitting coil and the power receiving coil so that the power transmitting unit-side resonance circuit and the power receiving unit-side resonance circuit resonate with each other to transmit power from the power transmitting unit to the power receiving unit, energy that is reflected without being transmitted from the power transmitting unit is reserved as resonance energy in the power transmitting unit-side resonance circuit, and of the energy received by the power receiving unit, energy that is reflected without being supplied to output is reserved as resonance energy in the power receiving unit-side resonance circuit.

(2) In a power transmission system configured of a power transmitting unit having a power transmitting coil and a power receiving unit having a power receiving coil, the power transmitting unit includes: a power transmitting unit-side resonance capacitor that configures a power transmitting unit-side resonance circuit along with the power transmitting coil; and a power transmitting unit-side alternating current generation circuit that is electrically connected with the power transmitting coil, including a switching circuit configured of a parallel connection circuit in which a switching element, a diode, and a capacitor are connected in parallel, and an inductor having such a value of inductance that makes it possible to form a current source, from an inputted direct-current voltage, that can relatively be taken as a direct current in comparison with an alternating current that is flowed in the power transmitting coil, so as to generate the alternating current to be flowed in the power transmitting coil, the power receiving unit includes: a power receiving unit-side resonance capacitor that configures a power receiving unit-side resonance circuit along with the power receiving coil; and a power receiving unit-side rectification circuit that is connected with the power receiving coil and rectifies an alternating current generated on the power receiving coil, a magnetic field resonance coupling circuit is configured with mutual inductance that is equivalently formed between the power transmitting coil and the power receiving coil so that the power transmitting unit-side resonance circuit and the power receiving unit-side resonance circuit resonate with each other to transmit power from the power transmitting unit to the power receiving unit, energy that is reflected without being transmitted from the power transmitting unit is reserved as resonance energy in the power transmitting unit-side resonance circuit, and of the energy received by the power receiving unit, energy that is reflected without being supplied to output is reserved as resonance energy in the power receiving unit-side resonance circuit.

(3) In a power transmission system configured of a power transmitting unit having a power transmitting coil and a power receiving unit having a power receiving coil, the power transmitting unit includes: a power transmitting unit-side resonance inductor that configures a power transmitting unit-side resonance circuit along with a power transmitting unit-side resonance capacitor; and a power transmitting unit-side alternating current generation circuit that is electrically connected with the power transmitting coil, including a switching circuit configured of a parallel connection circuit in which a switching element, a diode, and a capacitor are connected in parallel, and an inductor having such a value of inductance that makes it possible to form a current source, from an inputted direct-current voltage, that can relatively be taken as a direct current in comparison with an alternating current that is flowed in the power transmitting coil, so as to generate the alternating current to be flowed in the power transmitting coil, the power receiving unit includes: a power receiving unit-side resonance inductor that configures a power receiving unit-side resonance circuit along with a power receiving unit-side capacitor; and a power receiving unit-side rectification circuit that is connected with the power receiving coil and rectifies an alternating current generated on the power receiving coil, an electric field resonance coupling circuit is configured with mutual capacitance that is equivalently formed between the power transmitting coil and the power receiving coil so that the power transmitting unit-side resonance circuit and the power receiving unit-side resonance circuit resonate with each other to transmit power from the power transmitting unit to the power receiving unit, energy that is reflected without being transmitted from the power transmitting unit is reserved as resonance energy in the power transmitting unit-side resonance circuit, and of the energy received by the power receiving unit, energy that is reflected without being supplied to output is reserved as resonance energy in the power receiving unit-side resonance circuit.

(4) It is preferable that the power receiving unit include an information transmitting circuit configured to detect output information of the power receiving unit-side rectification circuit and transmit the output information having been detected to the power transmitting unit side, and that the power transmitting unit include an output information receiving circuit configured to receive the output information and a transmission power control circuit configured to control the transmission power through controlling the power transmitting unit-side alternating current generation circuit in accordance with the output information.

(5) For example, it is preferable that the information transmitting circuit be a circuit that transmits the output information by wireless communication, and the output information receiving circuit be a circuit that receives the output information by wireless communication.

(6) Further, for example, it is preferable that the information transmitting circuit be a circuit that converts an electric signal to an optical signal so as to transmit the output information, and the output information receiving circuit be a circuit that converts an optical signal to an electric signal so as to receive the output information.

(7) For example, it is preferable that the power transmitting unit-side alternating current generation circuit be configured to control transmission power using frequency control PFM (pulse frequency modulation) in which a switching frequency for turning on/off a switching circuit is changed.

(8) Further, for example, it is preferable that the power transmitting unit-side alternating current generation circuit be configured to control transmission power by deforming a waveform of a resonance current with respect to an ideal sine curve using PWM (pulse width modulation) in which a time ratio is controlled by turning on/off a switching circuit at a fixed switching frequency.

(9) It is preferable that the power receiving unit-side rectification circuit be a synchronous rectification circuit including a switching element.

(10) It is preferable that the power receiving unit includes an operation frequency control circuit for controlling an operation frequency (switching frequency) of the synchronous rectification circuit, and be configured to control reception power with the stated operation frequency.

(11) It is preferable that the power receiving unit include a control circuit for controlling a circuit of the power receiving unit side, and the stated control circuit be configured to operate using power that the power receiving unit has received.

(12) It is preferable that, when power is transmitted from an output section of the power receiving unit-side rectification circuit, the power receiving unit-side rectification circuit act as the power transmitting unit-side alternating current generation circuit and the power transmitting unit-side alternating current generation circuit act as the power receiving unit-side rectification circuit, thereby making it possible to transmit power bi-directionally.

(13) It is preferable that a resonance capacitor be provided in parallel with respect to the power transmitting coil or the power receiving coil.

(14) It is preferable that the above resonance capacitor be configured with stray capacitance which is made to become equivalent capacitance by electric field resonance formed between the power transmitting coil and the power receiving coil.

(15) It is preferable that the above resonance capacitor be configured with equivalent mutual capacitance formed between the power transmitting coil and the power receiving coil.

(16) For example, it is preferable that the power transmitting coil and the power receiving coil be air-core inductors.

(17) It is preferable that the aforementioned mutual inductance be equivalent magnetization inductance generated by magnetic field resonance coupling which is formed between the power transmitting coil and the power receiving coil.

(18) Of inductance components of the power transmitting coil or the power receiving coil, it is preferable that leakage inductance that is not related to resonance coupling be used as an inductor which configures the power transmitting unit-side resonance circuit or the power receiving unit-side resonance circuit.

(19) It is preferable that the power transmitting unit-side alternating current generation circuit include a plurality of the power transmitting coils and a plurality of the switching circuits, the power transmitting coils and the switching circuits be configured to be electrically connected with each other, and the plurality of switching circuits sequentially perform switching operations in a periodic manner.

(20) It is preferable that the power transmitting unit-side alternating current generation circuit include the plurality of switching circuits, the plurality of switching circuits be configured to be electrically connected with the power transmitting coils, and the plurality of switching circuits sequentially perform the switching operation in a periodic manner.

Advantageous Effects of Disclosure

According to the present disclosure, LC resonance circuits are provided at both a power transmitting unit side and a power receiving unit side, the two LC resonance circuits are made to resonate with each other, and then power can be transmitted between a power transmitting coil and a power receiving coil while making use of resonance coupling of a magnetic field, an electric field, or both the fields. Further, only effective power is transmitted from the power transmitting unit side to the power receiving unit side by making use of resonance, while reactive power that is reflected without being transmitted circulates in the respective LC resonance circuits of the power transmitting unit side and the power receiving unit side to be reserved as resonance energy, thereby making it possible to significantly lessen power loss.

BRIEF DESCRIPTIONS OF THE DRAWINGS

DETAILED DESCRIPTION

First Embodiment

Figure 1:
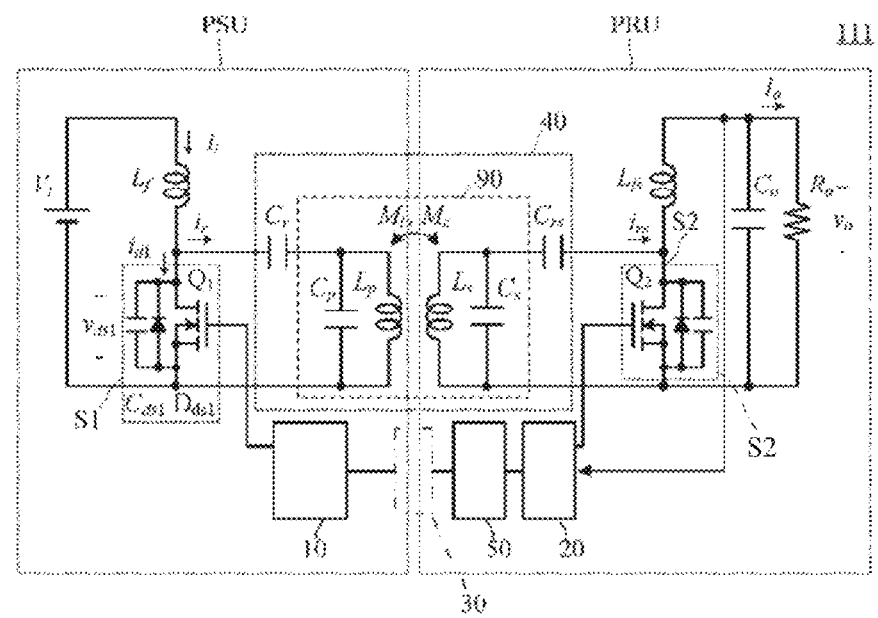
FIG. 1 is a circuit diagram of a power transmission system 111 according to a first embodiment.

FIG. 1 is a circuit diagram of a power transmission system 111 according to a first embodiment.

The power transmission system 111 is configured of a power transmitting unit PSU and a power receiving unit PRU.

The power transmission system 111 is a system that includes an input power source Vi in an input section of the power transmitting unit PSU and provides a stable direct-current energy to a load Ro of the power receiving unit PRU.

The power transmitting unit PSU includes: a power transmitting coil Lp; power transmitting unit-side resonance capacitors Cr and Cp that configure a power transmitting unit-side resonance circuit along with the power transmitting coil Lp; a switching circuit S1 that is connected with the power transmitting coil Lp and configured of a parallel connection circuit in which a switching element Q1, a diode Dds1, and a capacitor Cds1 are connected in parallel; and a power transmitting unit-side alternating current generation circuit (Lf, S1, Cr, Cp, Lp) that includes an inductor Lf having such a value of inductance that makes it possible to form a current source, from an inputted direct-current voltage, that can relatively be taken as a direct current with respect to an alternating current that is flowed in the power transmitting coil Lp. The inductance value of the inductor Lf is sufficiently larger in comparison with that of the power transmitting coil Lp and can become high impedance at a switching frequency so that a variation in a current that flows therein is sufficiently small.

The power receiving unit PRU includes: a power receiving coil Ls; power receiving unit-side resonance capacitors Crs and Cs that configure a power receiving unit-side resonance circuit along with the power receiving coil Ls; and a power receiving unit-side rectification circuit (Lfs, S2, Co) that is connected with the power receiving coil Ls, is configured of an inductor Lfs, a switching circuit S2, and a smoothing capacitor Co, and rectifies an alternating current generated on the power receiving coil Ls. The switching circuit S2 is configured of a parallel connection circuit in which a switching element Q2, a diode, and a capacitor are connected in parallel.

Further, the power transmitting unit PSU is provided with a switching control circuit 10 for controlling the switching element Q1. The power receiving unit PRU is provided with a switching control unit 20 for controlling the switching element Q2 and a transmission control circuit 50. The transmission control circuit 50 receives a switching control signal (synchronization signal) to the switching element Q1 from the switching control circuit 10 and generates a control signal to be given to the switching control circuit 10 in order to control reception power of the power receiving unit PRU.

Transmission between the switching control circuit 10 and the transmission control circuit 50 is carried out in a state of being electrically insulated from each other by a signal transmitting means 30.

The power transmitting coil Lp, the power receiving coil Ls, and the resonance capacitors Cp and Cs configure an electromagnetic field resonance coupling circuit 90. The electromagnetic field resonance coupling circuit 90 and the resonance capacitors Cr, Crs configure a multi-resonant circuit 40.

The following are characteristic configurations and actions of the power transmission system 111.

(1) It is a power transmission system using the power transmitting coil Lp and the power receiving coil Ls.

(2) Currents of the power transmitting coil Lp and the power receiving coil Ls resonate with each other so as to form resonance coupling and to transmit power.

(3) Electromagnetic field resonance coupling is formed between the power transmitting coil Lp and the power receiving coil Ls.

(4) Magnetic field resonance coupling is formed between the power transmitting coil Lp and the power receiving coil Ls.

(5) Electric field resonance coupling is formed between the power transmitting coil Lp and the power receiving coil Ls.

(6) ZVS (zero voltage switching) operation can be carried out in the switching element by setting a switching frequency for switching operation to be higher with respect to a resonance frequency held by a multi-resonant circuit including the power transmitting coil Lp and the power receiving coil Ls.

(7) A switching frequency fs and an LC multi-resonant circuit (Lf-Cr, Lfs-Crs) resonate with each other so that power is transmitted through the resonance. That is, power is transmitted due to resonance in the resonance circuits of the power transmitting circuit and power receiving circuit.

(8) Transmission power is adjusted in a manner in which output is detected and information of the detected output is transmitted to the power transmitting unit side using a feedback circuit so as to control the power transmitting unit-side alternating current generation circuit.

(9) The output information is transmitted to the power transmitting unit side using a wireless communication device in the feedback circuit.

(10) The output information is transmitted to the power transmitting unit side using an optical element in the feedback circuit.

(11) Transmission power is controlled by the frequency control PFM (pulse frequency modulation) while changing the switching frequency.

(12) Transmission power is controlled by the PWM (pulse width modulation) in which an on-time ratio of the switching element is controlled.

(13) Rectification loss is reduced with the synchronous rectification circuit on the power receiving unit side.

(14) Operation of the synchronous rectification circuit on the power receiving unit side is controlled.

(15) The control circuit on the power receiving unit side can be operated using the power that has been received.

(16) Power can be transmitted bi-directionally.

(17) As will be described later, switching frequencies can be switched between a forward direction and a reverse direction. Accordingly, by selecting appropriate frequencies in the forward and reverse directions, respectively, and controlling the transmission of power, a failure operation in which power is transmitted in the wrong direction can be prevented from occurring.

(18) Of inductance components of the power transmitting coil and the power receiving coil, leakage inductance that is not related to coupling is used as an inductor which configures the power transmitting unit-side resonance circuit or the power receiving unit-side resonance circuit.

(19) A capacitor provided in parallel to the power transmitting coil or the power receiving coil can undergo the matching with respect to mutual capacitance formed between the power transmitting coil Lp and the power receiving coil Ls.

(20) The mutual capacitance can use stray capacitance which is made to become equivalent capacitance by electric field resonance coupling formed between the power transmitting coil and the power receiving coil.

(21) The resonance capacitors Cp and Cs can use equivalent stray capacitance formed by electric field resonance that is formed on both ends of a winding of the power transmitting coil or the power receiving coil.

(22) By forming electromagnetic field resonance coupling using a magnetic material such as ferrite or the like in a magnetic path formed by the power transmitting coil and the power receiving coil, power can be efficiently transmitted.

(23) Mutual inductance can use magnetization inductance that is made to become equivalent inductance by magnetic field resonance coupling which is formed between the power transmitting coil and the power receiving coil.

Operation of the power transmission system 111 shown in FIG. 1 is as follows.

By turning on/off the switching element Q1 through the control of the switching control circuit 10, an alternating current is flowed in the power transmitting coil Lp by the power transmitting unit-side alternating current generation circuit. Meanwhile, by turning on/off the switching element Q2 through the control of the switching control circuit 20, a voltage is induced on the power receiving coil Ls so that a current flows therein, and this current is rectified to a direct current. The switching control circuit receives a switching control signal (synchronization signal) to the switching element Q1 from the switching control circuit 10 via the transmission control circuit 50 and performs synchronous rectification control on the switching element Q2. In the power transmission system 111 according to the first embodiment shown in FIG. 1, switching elements having parasitic output capacitance, a parasitic diode, and so on such as MOSFETs are used for the switching elements Q1 and Q2, and the switching circuits S1 and S2 are configured making use of the stated parasitic capacitance, the parasitic diode, and so on.

The transmission control circuit 50 detects output (voltage, current, or power) to the load Ro and transmits feedback information thereof to the power transmitting unit PSU side via the signal transmitting means 30.

In FIG. 1, a portion enclosed by a thick broken line configures the electromagnetic field resonance coupling circuit 90, while a portion enclosed by a thin broken line configures the multi-resonant circuit 40. A parameter M1 shown in FIG. 1 indicates a mutual coefficient of magnetic field resonance, that is, presence of mutual inductance, while a parameter Mc indicates a mutual coefficient of electric field resonance coupling, that is, presence of mutual capacitance. Combination of the mutual inductance M1 and the mutual capacitance Mc configures a mutual coefficient M as electromagnetic field resonance coupling. The multi-resonant circuit 40 including the electromagnetic field resonance coupling circuit 90 resonates in the two LC resonance circuits on the power transmitting unit side and the power receiving unit side, respectively.

The power transmitting unit-side resonance circuit is configured of the resonance capacitor Cr of the power transmitting unit PSU and an equivalent resonance inductor Lf that is connected in series with the resonance capacitor Cr. Likewise, the power receiving unit-side resonance circuit is configured of the resonance capacitor Crs of the power receiving unit PRU and an equivalent resonance inductor Lfs that is connected in series with the resonance capacitor Crs. The resonance circuit on the power transmitting unit side and the resonance circuit on the power receiving unit side resonate with each other so that each of the resonance circuits resonates, whereby power is transmitted by two types of resonance coupling, that is, one is magnetic field resonance coupling by mutual inductance while the other is electric field resonance coupling by mutual capacitance, between the power transmitting coil Lp and the power receiving coil Ls.

The capacitors Cp and Cs promote the power transmission by electromagnetic field resonance coupling. In other words, the capacitors Cp, Cs and mutual capacitance (Cm) to be explained later based on the equivalent circuit configure a power transmission circuit by a π-type electric field resonance coupling, thereby transmitting the power. The mutual capacitance Cm, also along with the resonance capacitors Cr and Crs, configures the power transmission circuit by electric field resonance coupling.

Both the resonance capacitors Cr and Crs also serve as capacitors that hold a direct-current voltage or block the flow of a direct current. On the power transmitting unit PSU side, the resonance capacitor Cr is charged during a turned-on period of the switching element Q1, and is discharged during a turned-off period of the switching element Q1. Meanwhile on the power receiving unit PRU side, the switching element Q2 is turned-on, a voltage of the resonance capacitor Crs is added to a voltage generated on the power receiving coil Ls, energy is supplied to the load Ro while the resonance capacitor Crs being discharged, and the resonance capacitor Crs is charged by the voltage generated on the power receiving coil Ls through the inductor Lfs to store electrostatic energy. In other words, voltages generated on the power receiving coil Ls during the respective turned-on periods of the switching elements Q1 and Q2 are added to output energy to the load Ro.

The two resonance circuits of the power transmitting unit side and the power receiving unit side are resonated with each other at the switching frequency fs of the switching element Q1. The multi-resonant circuit 40 is configured by the two resonance circuits including the electromagnetic field resonance coupling circuit 90 of the power transmitting unit side and the power receiving unit side. The multi-resonant circuit 40 has a resonance frequency fr at which combined impedance reactance of the multi-resonant circuit 40 comes to nearly zero so that the magnitude of the combined impedance is minimized. As such, in the case where resonance takes place as the switching frequency fs and the resonance frequency fr come closer to each other, the currents respectively flowing in the two resonance circuits become large in size, thereby increasing the output power. In other words, in the case where the switching element is turned on/off at a higher switching frequency fs than the resonance frequency fr held by the overall multi-resonant circuit 40 which is configured by combining the power transmitting unit-side resonance circuit and the power receiving unit-side resonance circuit including the electromagnetic field resonance coupling circuit, resonance takes place as the switching frequency fs comes closer to the resonance frequency fr so that the currents flowing into the multi-resonant circuit become large in size to increase the output power.

Accordingly, the electromagnetic field resonance coupling circuit 90 is configured by mutual inductance and mutual capacitance equivalently formed between the power transmitting coil and the power receiving coil, and the power transmitting unit-side resonance circuit and the power receiving unit-side resonance circuit resonate with each other, whereby power is transmitted from the power transmitting unit to the power receiving unit. Meanwhile, energy that is reflected without being transmitted from the power transmitting unit (reactive power) is reserved as resonance energy in the power transmitting unit-side resonance circuit. In addition, of the energy received by the power receiving unit, energy that is reflected without being supplied to output (reactive power) is also reserved as resonance energy in the power receiving unit-side resonance circuit. As described above, of the inputted power, power that has failed in being transmitted and has become reflection power is not taken as energy loss, but can be reserved as resonance energy.

Figure 2:
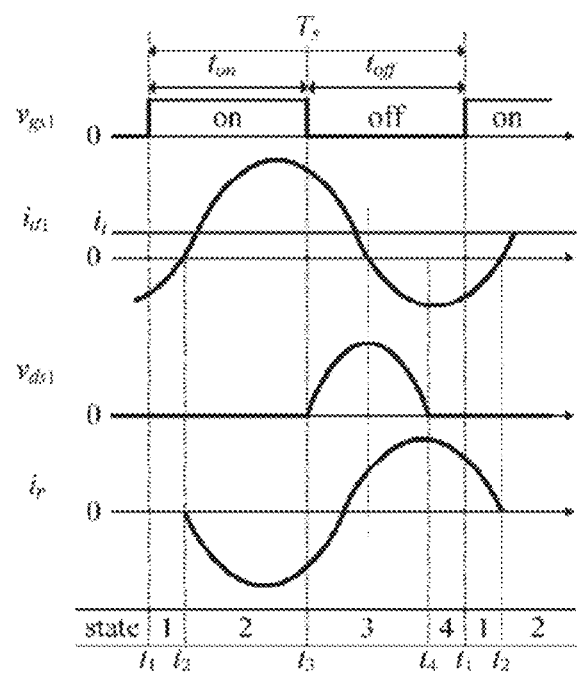
FIG. 2 is a diagram illustrating voltage and current waveforms at the corresponding portions in the power transmission system 111 shown in FIG. 1.

FIG. 2 is a diagram illustrating voltage and current waveforms at the corresponding portions in the power transmission system 111 shown in FIG. 1. Hereinafter, operations in the respective states of switching period will be described with reference to FIGS. 1 and 2.

State 1: Time t1 to t2

On the power transmitting unit side, a current id1 that flows in the switching element Q1 is a negative current, and the switching element Q1 and a diode Dds1 connected to both ends of the switching element Q1 are conductive. A resonance current is allowed to flow in the power transmitting coil Lp and the resonance capacitor Cr; a resonance current also flows in the power receiving coil Ls and the resonance capacitor Crs.

On the power receiving unit side, the resonance current is rectified by the synchronous rectification switching element Q2, and the rectified and smoothed current is supplied to the load so as to transmit the power.

The system goes to State 2 when the current id1 flowing in the switching element Q1 becomes a positive current.

State 2: Time t2 to t3

The current id1 flowing in the switching element Q1 becomes a positive current, the diode Dds1 becomes non-conductive, a current flows only in the switching element Q1. A resonance current is allowed to flow in the power transmitting coil Lp and the resonance capacitor Cr; a resonance current also flows in the power receiving coil Ls and the resonance capacitor Crs.

On the power receiving unit side, the resonance current is rectified by the synchronous rectification switching element Q2, and the rectified and smoothed current is supplied to the load so as to transmit the power.

The system goes to State 3 when the switching element Q1 is turned off.

State 3: Time t3 to t4

The capacitor Cds1 on both of the ends of the switching element Q1 starts to resonate, is charged first, and is discharged when having exceeded the peak voltage. The system goes to State 4 when a voltage vds1 becomes 0 volt.

State 4: Time t4 to t1

The current id1 becomes a negative current, and the diode becomes conductive. During this period, the ZVS operation is carried out by turning on the switching element Q1. A resonance current is allowed to flow in the power transmitting coil Lp and the resonance capacitor Cr; a resonance current also flows in the power receiving coil Ls and the resonance capacitor Crs.

On the power receiving unit side, the resonance current is rectified by the synchronous rectification switching element Q2, and the rectified and smoothed current is supplied to the load so as to transmit the power.

The system goes to State 1 when the switching element Q1 is turned on.

Then, States 1 through 4 are periodically repeated in the manner described above.

Figure 3:
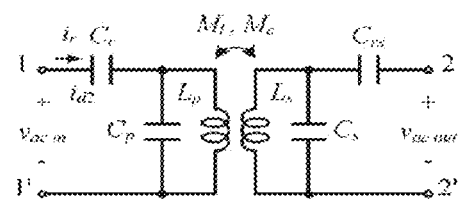
FIG. 3(A) is a circuit diagram of a multi-resonant circuit that includes an electromagnetic field resonance coupling circuit 90 shown in FIG. 1 and an electromagnetic field resonance coupling circuit configured of resonance capacitors Cr and Crs.
FIG. 3(B) is an equivalent circuit diagram thereof.
Figure 3:
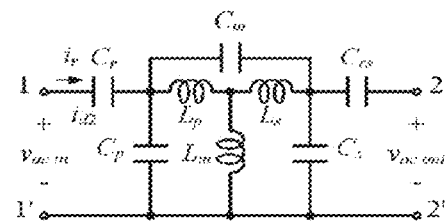

FIG. 3(A) is a circuit diagram of the multi-resonant circuit 40 that includes the electromagnetic field resonance coupling circuit 90 shown in FIG. 1 and equivalent electromagnetic field resonance coupling configured with the resonance capacitors Cr and Crs. FIG. 3(B) is an equivalent circuit diagram thereof. Here, mutual inductance Lm is indicated as an equivalent inductor for transmitting the power by magnetic field resonance coupling between the power transmitting coil Lp and the power receiving coil Ls, and the mutual capacitance Cm is indicated as an equivalent capacitor for transmitting the power by electric field resonance coupling between the power transmitting coil Lp and the power receiving coil Ls.

An input current i acin (t) that flows in the electromagnetic field resonance coupling circuit due to the resonance can be approximately expressed by the following formula in which the amplitude of a resonance current is taken as Iac.

$$i\ acin(t) = Iac \times \sin(\omega st), \text{ where } \omega s = 2\pi/Ts$$

A sine-wave current i acin (t) is supplied between terminals 1 and 1'. Although such a current that includes various frequency components attempts to flow between the terminals 1 and 1', resonance takes place while the electromagnetic field resonance coupling circuit blocks current waveforms of high-order frequency components whose impedance is large. Accordingly, only a resonance current waveform mainly including the switching frequency components is allowed to flow, thereby making it possible to efficiently transmit the power.

According to the first embodiment, the following effects can be obtained.

(1) A power transmission system for directly supplying electric power to a distanced area can be configured, the system can be configured in a much simplified manner by lessening a plurality of power conversion mechanisms, and enhancement in efficiency and reduction in size of the power transmission system can be realized.

(2) Power transmission is made by resonance that takes place in the respective resonance circuits of the power transmitting circuit and the power receiving circuit, whereby the power transmission can be made more efficiently and in a longer distance than in a case of the power transmission made by electromagnetic induction.

(3) Power transmission is made not only making use of magnetic field resonance coupling but also making use of electric field resonance coupling that are formed between the power transmitting coil and the power receiving coil, whereby the power transmission can be made more efficiently than the power transmission that is made making use of only magnetic field resonance coupling.

(4) By flowing a resonance current in equivalent mutual capacitance and mutual inductance formed by electromagnetic field resonance coupling that is formed between the power transmitting coil and the power receiving coil, both the sides resonate with each other so as to transmit the power.

(5) By flowing a resonance current in equivalent mutual inductance formed by magnetic field resonance coupling that is formed between the power transmitting coil and the power receiving coil, both the sides resonate with each other so as to transmit the power.

(6) By flowing a resonance current in equivalent mutual capacitance formed by electric field resonance coupling that is formed between the power transmitting coil and the power receiving coil, both the sides resonate with each other so as to transmit the power.

(7) Of inductance components of the power transmitting coil and the power receiving coil, leakage inductance that is not related to resonance coupling can be used as an equivalent inductor which configures the power transmitting unit-side resonance circuit or the power receiving unit-side resonance circuit. This makes a component for a resonance inductor unnecessary, leading to reduction in size and weight of the power transmission system device.

(8) The power transmitting coil Lp and the power receiving coil Ls each form an equivalent capacitor by electric field resonance, and the formed capacitor can be used as the resonance capacitor. This makes a component for capacitance unnecessary, leading to reduction in size and weight thereof.

(9) By setting a switching frequency for switching operation to be higher with respect to a resonance frequency held by the multi-resonant circuit including the power transmitting coil Lp and the power receiving coil Ls, the ZVS (zero voltage switching) operation is carried out in the switching element so as to lessen the switching loss.

(10) Upon detection of the output, information of the detected output is transmitted to the power transmitting unit side via the feedback circuit so as to control the power transmitting unit-side alternating current generation circuit for adjustment of the transmission power, whereby the electronic apparatus can be appropriately operated.

(11) Because the output information is transmitted to the power transmitting unit side using a wireless communication device in the feedback circuit, the output power can be adjusted on the power transmitting unit side while being electrically insulated.

(12) Because the output information is transmitted to the power transmitting unit side using an optical element in the feedback circuit, the output power can be adjusted on the power transmitting unit side while being electrically insulated.

(13) By making use of the circuit behavior in which combined impedance of the multi-resonant circuit including the resonance coupling circuit varies in accordance with frequencies, the transmission power can be controlled by changing the amplitude of the resonance current using the frequency control PFM (pulse frequency modulation) in which output power is controlled through changing the switching frequency. As a result, the system can be appropriately operated so as to supply the power that meets the request from the electronic apparatus.

(14) Transmission power is also controlled by deforming a waveform of the resonance current with respect to an ideal sine curve using the PWM (pulse width modulation) control in which the on-time ratio of the switching element is controlled while fixing the switching frequency. As a result, the system can be appropriately operated so as to supply the power that meets the request from the electronic apparatus. In addition, using a fixed switching frequency can limit a frequency band used in operation. This makes it possible to easily satisfy the EMC as well as to improve the controllability in controlling the output.

(15) With the synchronous rectification circuit using a switching element that has a small on-resistance on the power receiving unit side, rectification loss can be reduced in comparison with a case in which a diode whose forward drop voltage is large is used.

(16) Operation of the synchronous rectification circuit on the power receiving unit side can be controlled. Further, through controlling the operation frequency of the synchronous rectification circuit on the power receiving unit side, transmission power can be adjusted from the power receiving unit side, not from the power transmitting unit side.

(17) The control circuit on the power receiving unit side can be operated using the power having been received. Therefore, because any power source need not be provided on the power receiving unit side, the unit can be made smaller and lighter.

(18) Because power can be bi-directionally transmitted, power can be transmitted from the power receiving unit side to the power transmitting unit side, power that has been received can be further transmitted to another unit with the power receiving unit side serving as a relay point, and so on. Because the system can be used as a relay system, by providing a plurality of the above-described units and making them serve as the relay points, a long-distance power transmission can be realized.

(19) The switching frequency can be switched correspondingly to a direction in which the power is intended to be transmitted, such as a forward direction, a reverse direction, and the like, and power can be appropriately transmitted with directivity and certification being checked. By setting specified locations for each switching frequency, power can be transmitted to a target location as desired. Accordingly, by switching the switching frequency, the power transmission can be prevented from being crossed and the power can be transmitted to a distanced target location.

(20) A capacitor provided in parallel to the power transmitting coil or the power receiving coil is matched with respect to mutual capacitance formed between the power transmitting coil and the power receiving coil so as to set an appropriate resonance frequency and to transmit the power.

(21) A capacitor provided in parallel to the power transmitting coil or the power receiving coil is matched with respect to mutual capacitance formed between the power transmitting coil and the power receiving coil so as to form an efficient electric field resonance coupling circuit. This makes it possible to transmit the power more efficiently than in a case in which there exists only magnetic field resonance coupling.

(22) By making the power transmitting coil and the power receiving coil be air-core coils, there exists no iron loss in the coils so that the power can be efficiently transmitted by wireless even at a higher frequency.

(23) Mutual inductance formed by magnetic field resonance coupling that is formed between the power transmitting coil and the power receiving coil is used. This makes a component for inductance unnecessary, leading to reduction in size and weight of the power transmission system device.

Although, in the example shown in FIG. 1, the switching control circuit 20 is configured to receive a synchronization signal from the transmission control circuit 50, a voltage induced on the power receiving coil Ls may be detected and the switching element Q2 may be driven in synchronization with the detection of the induced voltage.

Second Embodiment

Figure 4:
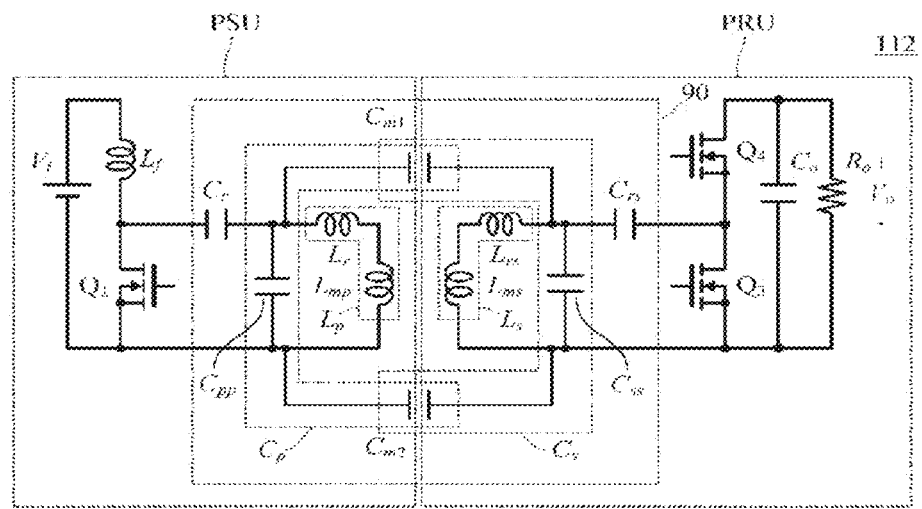
FIG. 4 is a circuit diagram of a power transmission system 112 according to a second embodiment.

FIG. 4 is a circuit diagram of a power transmission system according to a second embodiment.

FIG. 4 is a circuit diagram of a power transmission system 112. In FIG. 4, different from the power transmission system 111 shown in FIG. 1, actually illustrated are mutual inductance Lmp and Lms that are equivalent inductance and related to magnetic field resonance coupling between the power transmitting coil Lp and the power receiving coil Ls, and leakage inductance Lr and Lrs that are equivalent inductance and are not related to the magnetic field resonance coupling. In addition, mutual capacitance Cm1 and Cm2, and leakage capacitance Cpp and Css that are equivalent capacitance and are not related to electric field resonance coupling are also illustrated. The stated inductance Lmp, Lms, Lr and Lrs, and the stated capacitance Cm1, Cm2, Cpp and Css are respectively configured of equivalent inductors of the power transmitting coil Lp and the power receiving coil Ls or configured of equivalent capacitance of the resonance capacitors Cp and Cs. Alternatively, these may be each configured of a discrete component or may be an entity in which equivalent inductance and equivalent capacitance are combined.

Further, different from the power transmission system 111 shown in FIG. 1, a switching element Q4 is provided instead of the inductor Lfs. A switching element Q3 and the switching element Q4 on the power receiving unit side are alternately switched with dead time interposed therebetween by a switching control circuit provided on the power receiving unit side, thereby synchronous rectification being carried out.

The following effects can be obtained from the power transmission system 112.

(a) By using the mutual inductance Lmp and Lms to become equivalent inductance due to magnetic field resonance coupling which is formed between the power transmitting coil Lp and the power receiving coil Ls, a component for the mutual inductor can be made unnecessary or made smaller, leading to reduction in size and weight of the power transmission system device.

(b) Of the inductance components in the power transmitting coil Lp or the power receiving coil Ls, leakage inductance that is not related to resonance coupling is used as a resonance inductor that configures a power transmitting unit-side resonance circuit or a power receiving unit-side resonance circuit. This makes it possible to make a component for the resonance inductor unnecessary or smaller, leading to reduction in size and weight of the power transmission system device.

(c) By using the mutual capacitance Cm1 and Cm2 to become equivalent capacitance due to electric field resonance coupling which is formed between the resonance capacitor Cp on the power transmitting unit side and the resonance capacitor Cs on the power receiving unit side, a component for the mutual inductor can be made unnecessary or made smaller, leading to reduction in size and weight of the power transmission system device.

(d) Of the capacitance components in the resonance capacitor Cp on the power transmitting unit side or the resonance capacitor Cs on the power receiving unit side, leakage capacitance that is not related to resonance coupling is used as a resonance capacitor that configures the power transmitting unit-side resonance circuit or the power receiving unit-side resonance circuit. This makes it possible to make a component for the resonance capacitor unnecessary or smaller, leading to reduction in size and weight of the power transmission system device.

(e) With the synchronous rectification circuit using the switching elements Q3 and Q4, a voltage is added every half cycle so as to generate equivalently twice the voltage.

Third Embodiment

Figure 5:
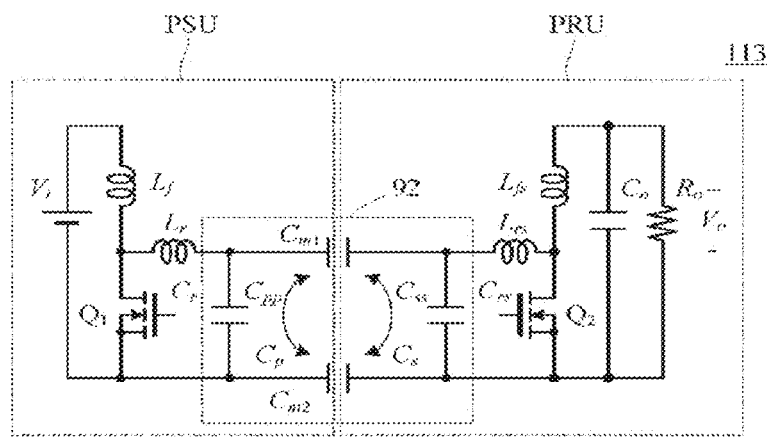
FIG. 5 is a circuit diagram of a power transmission system 113 according to a third embodiment.

FIG. 5 is a circuit diagram of a power transmission system 113. Different from the power transmission system 111 shown in FIG. 1 of the first embodiment, there are included the mutual capacitance Cm1 and Cm2 that are equivalent capacitance and are related to electric field resonance coupling with the resonance capacitor Cp on the power transmitting unit side and the resonance capacitor Cs on the power receiving unit side, and the leakage capacitance Cpp and Css that are equivalent capacitance and are not related to the electric field resonance coupling. Meanwhile, mutual inductance which is equivalent inductance related to magnetic field resonance coupling is not included. In other words, not an electromagnetic field resonance coupling circuit (electromagnetic field resonance coupling circuit 90 in FIG. 1) which is based on resonance coupling via an electric field and a magnetic field, but an electric field resonance coupling circuit 92 which is based on resonance coupling via only an electric field is formed.

In the power transmission system 113, because the electric field resonance coupling circuit 92 is formed therein, the number of components is smaller than that of a case in which an electromagnetic field resonance coupling circuit is formed. This makes it possible to configure the system using simplified circuits, thereby the following effects being obtained.

(a) By using the mutual capacitance Cm1 and Cm2 to become equivalent capacitance due to electric field resonance coupling which is formed between the resonance capacitor Cp on the power transmitting unit side and the resonance capacitor Cs on the power receiving unit side, a component for the mutual inductor can be made unnecessary or made smaller, leading to reduction in size and weight of the power transmission system device.

(b) Of the capacitance components in the resonance capacitor Cp on the power transmitting unit side or the resonance capacitor Cs on the power receiving unit side, leakage capacitance that is not related to resonance coupling is used as a resonance capacitor that configures the power transmitting unit-side resonance circuit or the power receiving unit-side resonance circuit. This makes it possible to make a component for the resonance capacitor unnecessary or smaller, leading to reduction in size and weight of the power transmission system device.

Fourth Embodiment

Figure 6:
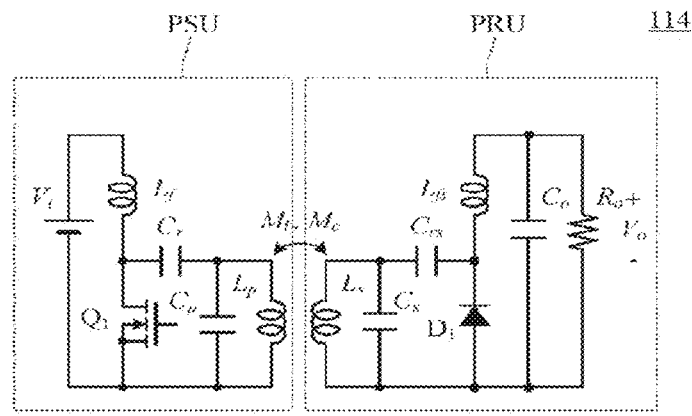
FIG. 6 is a circuit diagram of a power transmission system 114 according to a fourth embodiment.

FIG. 6 is a circuit diagram of a power transmission system 114 according to a fourth embodiment. In this example, different from the power transmission system 111 of the first embodiment, a rectification diode D1 is provided on the power receiving unit side instead of the switching element Q2, which is a synchronous rectification element. That is, the power receiving unit-side rectification circuit is configured with the diode D1.

In this power transmission system 114, the power receiving unit PRU can be configured in a simplified manner. Further, the rectification diode D1 allows a current to flow therein only in a forward direction, that is, unlike the power transmission system 111 of the first embodiment, a negative current does not flow in the power receiving unit-side rectification circuit. Accordingly, since there does not exit a current that is regenerated from the output side, an amount of current that circulates in the power receiving unit-side resonance circuit is reduced, which makes it possible to lessen conduction loss.

Fifth Embodiment

Figure 7:
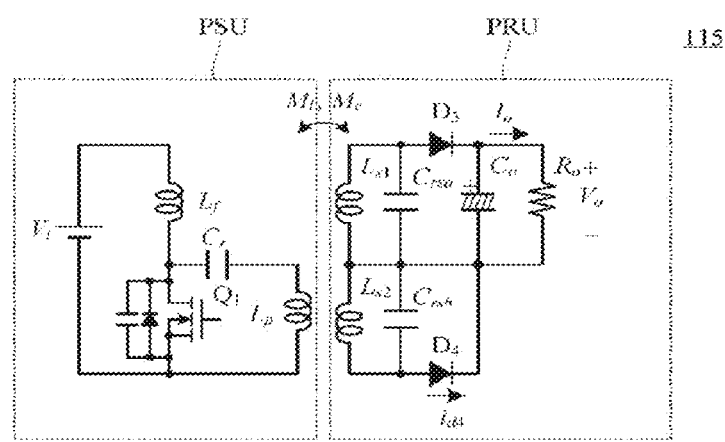
FIG. 7 is a circuit diagram of a power transmission system 115 according to a fifth embodiment.

FIG. 7 is a circuit diagram of a power transmission system 115 according to a fifth embodiment. The configuration of the power receiving unit PRU of this system differs from that of the power transmission system shown in FIG. 1 of the first embodiment. In the fifth embodiment, a center-tap rectification circuit is configured of power receiving coils Ls1 and Ls2, diodes D3 and D4, and the smoothing capacitor Co. The configuration of the power transmitting unit PSU is the same as the configuration thereof described in the first embodiment.

In the fifth embodiment, resonant capacitors Crsa, Crsb (capacitors corresponding to Cs in FIG. 1) are configured by stray capacitance generated on the power receiving coils Ls1, Ls2 or by discrete capacitors on the power receiving unit PRU side.

Using two receiving coils Ls1, Ls2 and two diodes D3, D4, the power transmission system 115 can disperse power loss on the power receiving unit side so as to lessen the power loss. In addition, the number of rectification elements is smaller than that of bridge rectification. Further, because a parallel resonance circuit is configured on the power receiving unit side, voltage gain can be made larger in comparison with a case in which a serial resonance circuit is configured.

Sixth Embodiment

Figure 8:
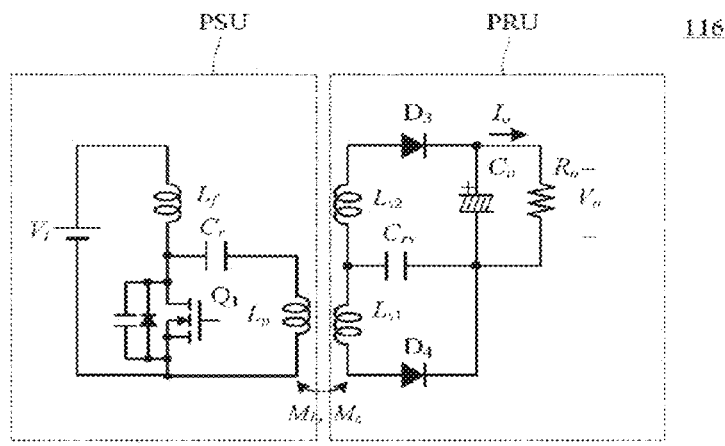
FIG. 8 is a circuit diagram of a power transmission system 116 according to a sixth embodiment.

FIG. 8 is a circuit diagram of a power transmission system 116 according to a sixth embodiment. In this example, different from the power transmission shown in FIG. 7 of the fifth embodiment, the resonance capacitor Crs is provided on the power receiving unit PRU side. By configuring a serial resonance circuit on the power receiving unit side in this manner, current gain can be made larger in comparison with a case of configuring a parallel resonance circuit.

Seventh Embodiment

Figure 9:
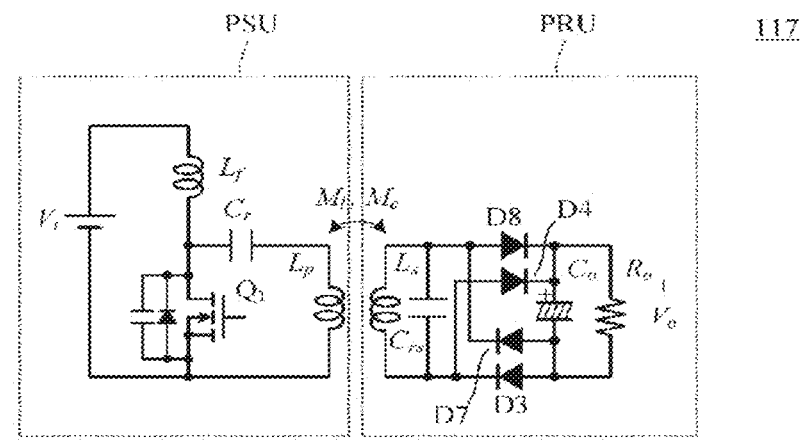
FIG. 9 is a circuit diagram of a power transmission system 117 according to a seventh embodiment.

FIG. 9 is a circuit diagram of a power transmission system 117 according to a seventh embodiment. The configuration of the power receiving unit PRU side differs from the configuration thereof shown in FIG. 1 of the first embodiment. In the seventh embodiment, a bridge rectification circuit configured with the diodes D3, D4, diodes D7, D8, and the smoothing capacitor Co is connected to the power receiving coil Ls. The configuration of the power transmitting unit PSU is the same as the configuration thereof described in the first embodiment.

On the power receiving unit PRU side, the resonance capacitor Crs (capacitor corresponding to Cs in FIG. 1) is configured with stray capacitance generated on the power receiving coil Ls or a discrete capacitor.

In the power transmission system 117 according to the seventh embodiment, a withstand voltage of the rectification element can be lowered in comparison with a case of the power transmission system shown in FIG. 8 of the sixth embodiment. Furthermore, because a parallel resonance circuit is configured on the power receiving unit side, voltage gain can be made larger in comparison with a case where a serial resonance circuit is configured.

Eighth Embodiment

Figure 10:
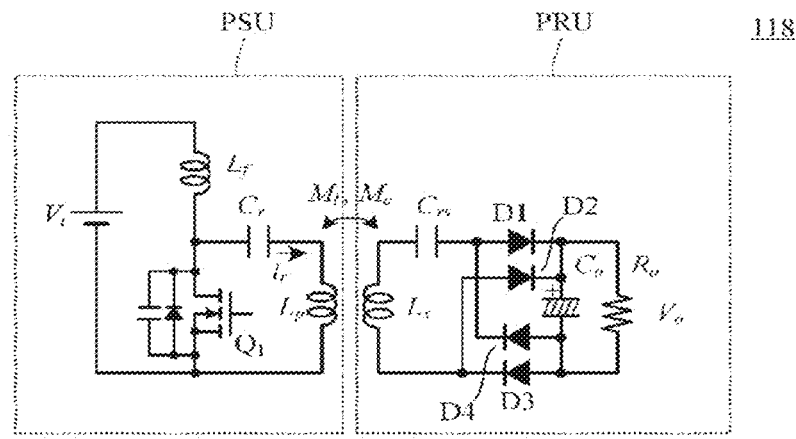
FIG. 10 is a circuit diagram of a power transmission system 118 according to an eighth embodiment.

FIG. 10 is a circuit diagram of a power transmission system 118 according to an eighth embodiment. The position of the resonance capacitor Crs differs from that in the power transmission system shown in FIG. 9 of the seventh embodiment. Accordingly, with this capacitor Crs, electromagnetic field resonance operation can be made at a predetermined resonant frequency.

In the power transmission system 118 according to the eight embodiment, by configuring a serial resonance circuit on the power receiving unit side in this manner, current gain can be made larger in comparison with a case of configuring a parallel resonance circuit.

Ninth Embodiment

Figure 11:
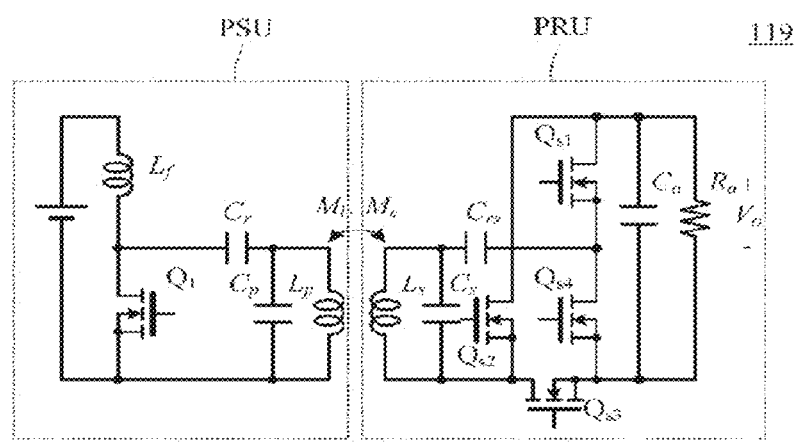
FIG. 11 is a circuit diagram of a power transmission system 119 according to a ninth embodiment.

FIG. 11 is a circuit diagram of a power transmission system 119 according to a ninth embodiment. In this example, a rectification circuit in the configuration of bridge rectification using four switching elements Qs1, Qs2, Qs3, and Qs4 is provided on the power receiving unit PRU side.

According to the ninth embodiment, voltages applied to the switching elements Qs1, Qs2, Qs3, and Qs4, respectively, on the power receiving unit PRU side are each halved, whereby loss in the switching elements can be lessened.

In the power transmission system 119, rectification loss can be lessened with a synchronous rectification circuit in comparison with the power transmission system described in the eighth embodiment. Further, the withstand voltage of the rectification switching element can be lowered with the bridge configuration. Furthermore, because the rectification circuit is configured using the switching elements, power can be bi-directionally transmitted. In addition, electromagnetic field resonance operation can be made at a predetermined resonant frequency using the resonance capacitor Crs.

Tenth Embodiment

Figure 12:
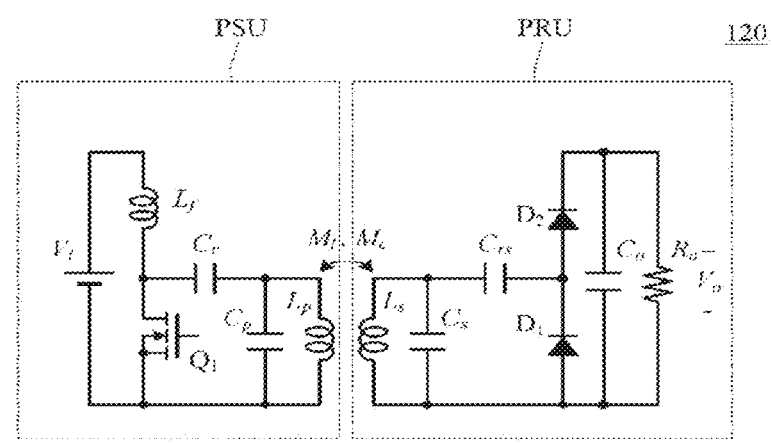
FIG. 12 is a circuit diagram of a power transmission system 120 according to a tenth embodiment.

FIG. 12 is a circuit diagram of a power transmission system 120 according to a tenth embodiment. In this example, a rectification circuit is provided on the power receiving unit PRU side using two diodes D1 and D2.

According to the tenth embodiment, the configuration of the power receiving unit PRU side can be simplified in comparison with the ninth embodiment. Further, because the rectification circuit is a passive circuit, a circuit for drive-controlling the rectification circuit is not needed.

Eleventh Embodiment

Figure 13:
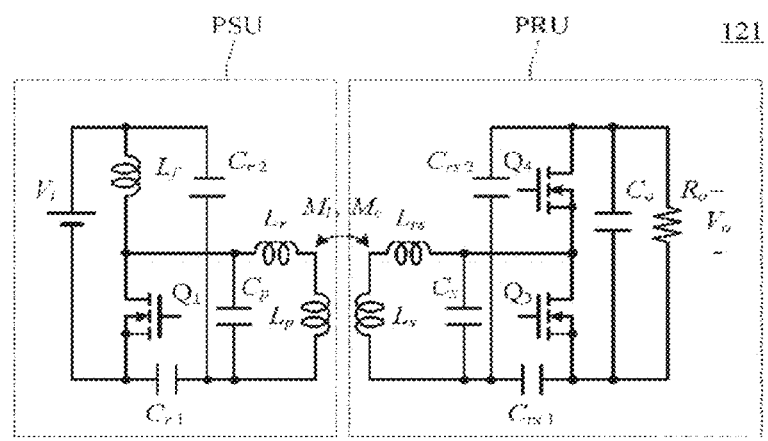
FIG. 13 is a circuit diagram of a power transmission system 121 according to an eleventh embodiment.

FIG. 13 is a circuit diagram of a power transmission system 121 according to an eleventh embodiment.

In this example, there are included capacitors Cr1, Cr2 configured to divide a voltage of the input power source Vi and capacitors Crs1, Crs2 configured to divide an output voltage V0. In other words, the resonance capacitor Cr in the power transmission system described in the first embodiment is divided into Cr1 and Cr2, and the resonance capacitor Crs therein is divided into Crs1 and Crs2. Here, leakage inductance of the power transmitting coil Lp and leakage inductance of the power receiving coil Ls are actually indicated as a resonance inductor Lr and a resonance inductor Lrs, respectively. The other constituent elements are the same as those shown in FIG. 1 of the first embodiment.

In the eleventh embodiment, a current that flows in a resonance capacitor is divided into two currents to flow in two capacitors. Therefore, loss of the capacitor is dispersed so as to reduce the total loss, thereby dispersing the heat. In addition, using a plurality of resonance capacitors makes it possible to arbitrarily set resonant frequencies, whereby resonance operation can be made with ease.

It is to be noted that the capacitors Cr1, Cr2 and the capacitors Crs1, Crs2 each have two functions, that is, one is a function to hold a direct-current voltage, block a direct current, and so on, and the other is a function to serve as a capacitor for serial resonance.

Twelfth Embodiment

Figure 14:
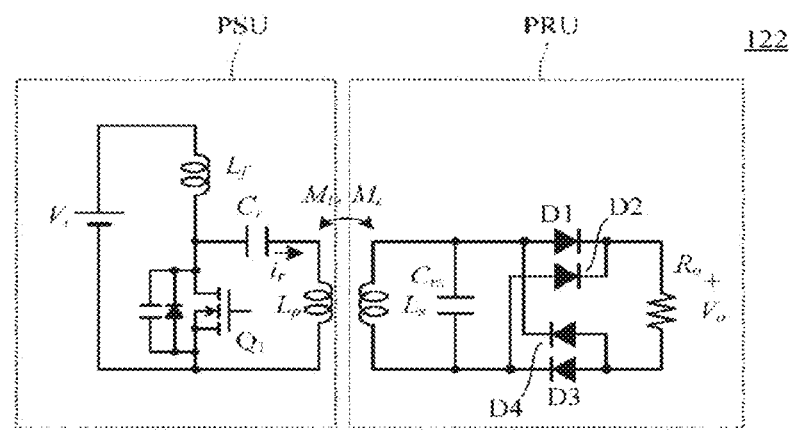
FIG. 14 is a circuit diagram of a power transmission system 122 according to a twelfth embodiment.

FIG. 14 is a circuit diagram of a power transmission system 122 according to a twelfth embodiment. In this example, power is transmitted so that a voltage generated on the capacitor Crs on the power receiving unit side is supplied to the load. Compared to a configuration in which power transmission is carried out so that a current flowing in a capacitor on the power receiving unit side is supplied to the load like an example described in FIG. 10 or the like, in the case where a voltage to be supplied to the load is higher, power can be transmitted more efficiently with this embodiment than the above-mentioned configuration at the same level of power supply.

Thirteenth Embodiment

Figure 15:
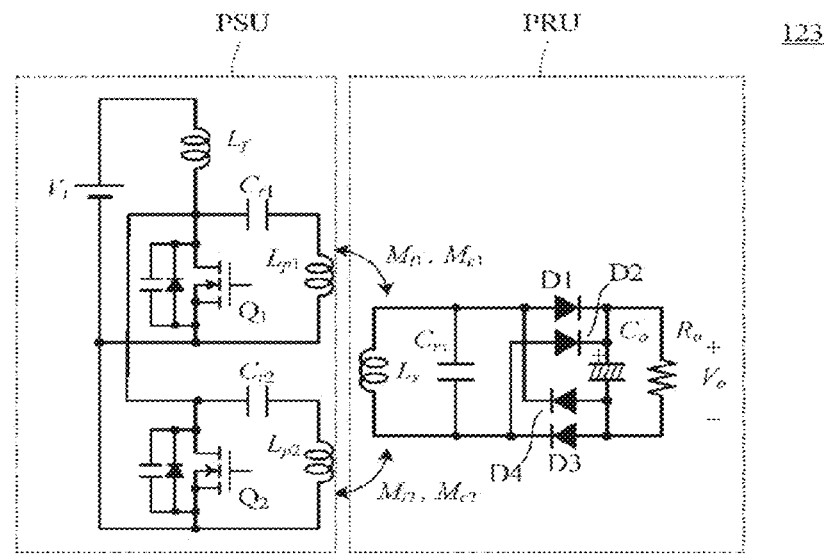
FIG. 15 is a circuit diagram of a power transmission system 123 according to a thirteenth embodiment.

FIG. 15 is a circuit diagram of a power transmission system 123 according to a thirteenth embodiment. In this example, a push-pull circuit is configured including two FETs Q1 and Q2 on the power transmitting unit side. With this, a larger amount of power can be supplied in comparison with a case where the push-pull configuration is made using one FET. Further, since the two FETs Q1 and Q2 alternately carry out switching operation, an electromagnetic field resonance coupling circuit can be formed equivalently twice the frequency.

Figure 16:
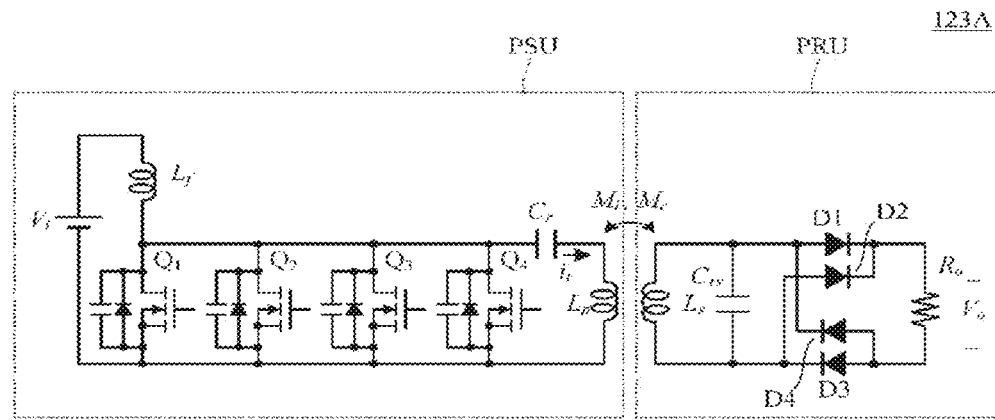
FIG. 16 is a circuit diagram of a transmission system 123A, which is another configuration example of the thirteenth embodiment.

FIG. 16 is a circuit diagram of a power transmission system 123A, which is another configuration example of the thirteenth embodiment. This example has a configuration in which a plurality of FETs Q1, Q2, Q3, and Q4 are included on the power transmitting unit side. With this, by causing the four FETs to sequentially carry out switching operation at the same switching frequency and at the same time ratio, a larger amount of power can be supplied in comparison with a case of using one semiconductor chip. Further, an electromagnetic field resonance coupling circuit can be formed at a frequency which is equivalently four times the switching frequency of one semiconductor chip. In other words, using "n" semiconductor chips of FET makes it possible to form an electromagnetic field resonance coupling circuit equivalently at an n-time high frequency. As higher frequencies are employed, coils can be made smaller, capacitance of smaller capacity can be used, and so on, whereby the power transmission system can be made smaller in size.

Fourteenth Embodiment

Figure 17:
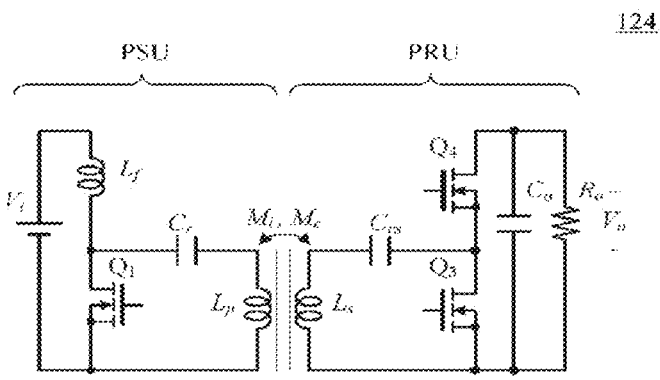
FIG. 17 is a circuit diagram of a power transmission system 124 according to a fourteenth embodiment.

FIG. 17 is a circuit diagram of a power transmission system 124 according to a fourteenth embodiment. This is an example in which a magnetic material such as ferrite or the like is used for a magnetic path that forms electromagnetic field resonance coupling.

In the power transmission system 124 shown in FIG. 17, using a magnetic material raises the degree of magnetic coupling, leading to raising the power transmission efficiency. In addition, with the use of ferrite, it is possible to suppress the radiation of an electromagnetic wave (magnetic flux and electric flux) into space.

Fifteenth Embodiment

Figure 18:
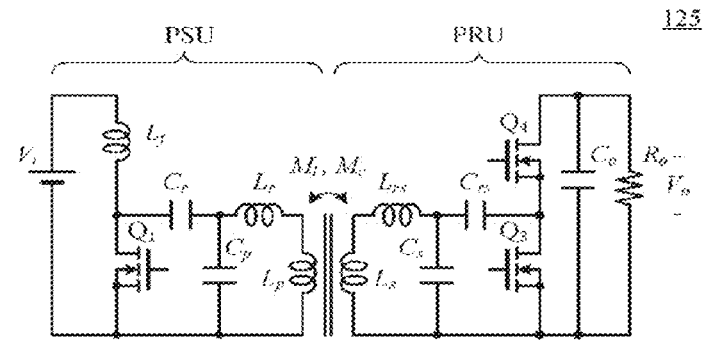
FIG. 18 is a circuit diagram of a power transmission system 125 according to a fifteenth embodiment.

FIG. 18 is a circuit diagram of a power transmission system 125 according to a fifteenth embodiment. This is an example in which a magnetic material such as ferrite or the like is used for a magnetic path that forms electromagnetic field resonance coupling. Also in this example, using a magnetic material raises the degree of magnetic coupling, leading to raising the power transmission efficiency. In addition, with the use of ferrite, it is possible to suppress the radiation of an electromagnetic wave (magnetic flux and electric flux) into space.

Sixteenth Embodiment

Figure 19:
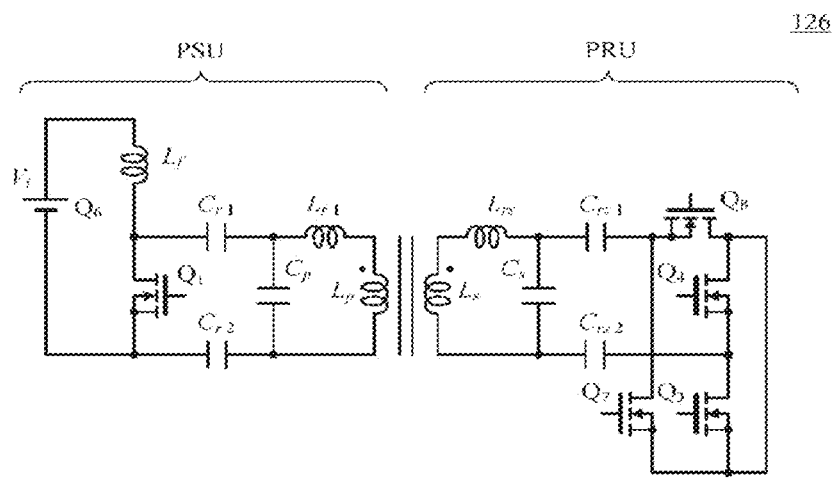
FIG. 19 is a circuit diagram of a power transmission system 126 according to a sixteenth embodiment.

FIG. 19 is a circuit diagram of a power transmission system 126 according to a sixteenth embodiment. In this example, two resonance capacitors Cr1 and Cr2 are provided in the power transmitting unit PSU, while in the power receiving unit PRU, there are provided two resonance capacitors Crs1 and Crs2. Further, a rectification circuit having a bridge-rectification configuration using four switching elements Q3, Q4, Q7 and Q8 is provided on the power receiving unit PRU side.

In the power transmission system 126, the power transmitting coil Lp of the power transmitting unit PSU and the power receiving unit coil Ls of the power receiving unit PRU are coils each having a magnetic core such as ferrite or the like. Accordingly, by using the magnetic material, the degree of magnetic coupling is raised so as to raise the power transmission efficiency. In addition, the radiation of an electromagnetic wave (magnetic flux and electric flux) into space is suppressed by the ferrite.

Seventeenth Embodiment

Figure 20:
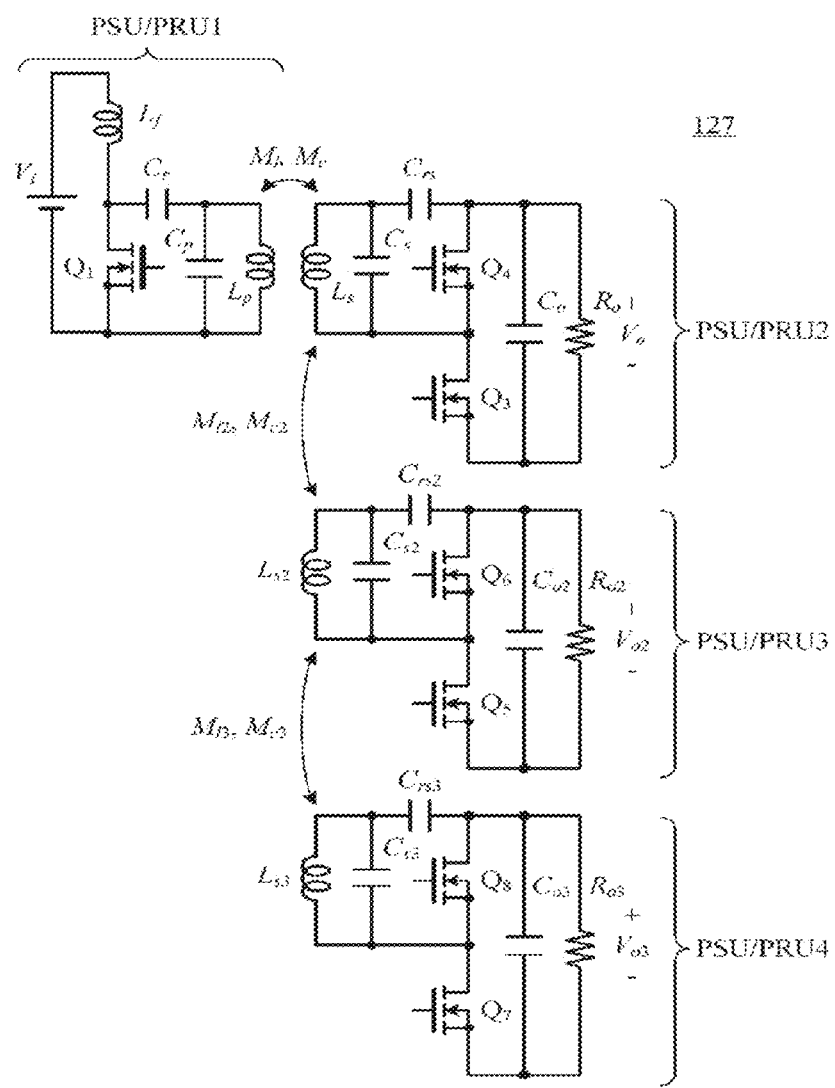
FIG. 20 is a circuit diagram of a power transmission system 127 according to a seventeenth embodiment.

FIG. 20 is a circuit diagram of a power transmission system 127 according to a seventeenth embodiment.

The power transmission system 127 is a system including a plurality of power transmitting/receiving units PSU/PRU1, PSU/PRU2, PSU/PRU3, and PSU/PRU4 capable of bidirectional power transmission.

In the case where a first power transmitting/receiving unit PSU/PRU1 serves as a power transmitting unit, a second power transmitting/receiving unit PSU/PRU2 configured to form electromagnetic field resonance coupling serves as a power receiving unit corresponding to the first unit. Therefore, power is transmitted from the first power transmitting/receiving unit PSU/PRU1 to the second power transmitting/receiving unit PSU/PRU2. Here, the load Ro of the second power transmitting/receiving unit PSU/PRU2 has a rechargeable battery and a charging circuit thereof.

A third power transmitting/receiving unit PSU/PRU3 corresponds to the second power transmitting/receiving unit PSU/PRU2, and serves as a power receiving unit in the case where the second power transmitting/receiving unit PSU/PRU2 serves as a power transmitting unit. In this case, in the second power transmitting/receiving unit PSU/PRU2, the above-mentioned rechargeable battery is used as a power source. A load Rot of the third power transmitting/receiving unit PSU/PRU3 has a rechargeable battery and a charging circuit thereof.

A fourth power transmitting/receiving unit PSU/PRU4 corresponds to the third power transmitting/receiving unit PSU/PRU3, and serves as a power receiving unit in the case where the third power transmitting/receiving unit PSU/PRU3 serves as a power transmitting unit. In this case, in the third power transmitting/receiving unit PSU/PRU3, the rechargeable battery is used as a power source. A load Ro3 of the fourth power transmitting/receiving unit PSU/PRU4 has a rechargeable battery and a charging circuit thereof.

As described above, by providing the plurality of power transmitting/receiving units, the power transmitting/receiving units provided in a middle stage relay the power, thereby making it possible to transmit the power to a distanced place.

In the case where resonant frequencies of the resonance circuits on the side of the plurality of power receiving units are made to differ from each other, if the power transmitting unit side is configured to perform switching operation at a specified switching frequency that corresponds to a specified power transmission target, power can be selectively transmitted to predetermined power receiving units among the plurality of power receiving units.

By switching the switching frequency in accordance with power transmission directions among the power transmitting/receiving units, power can be transmitted in a target direction (to a target place) corresponding to each switching frequency. In other words, through control operation such as switching the switching frequencies or the like, an electronic apparatus to which power is transmitted is properly selected, power is transmitted in an appropriate direction as well as to an appropriate place, and so on, so that the power transmission is prevented from being crossed.

Eighteenth Embodiment

Figure 21:
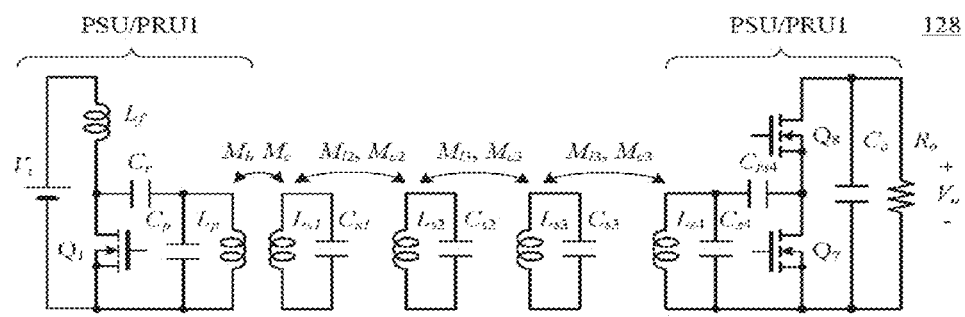
FIG. 21 is a circuit diagram of a power transmission system 128 according to an eighteenth embodiment.

FIG. 21 is a circuit diagram of a power transmission system 128 according to an eighteenth embodiment. In this example, a plurality of resonators are disposed between the power transmitting coil Lp and a power receiving coil Ls4. In FIG. 21, the power receiving coil (inductor) Ls1 and a capacitor Cs1 configure a first relay LC resonance circuit, the power receiving coil (inductor) Ls2 and a capacitor Cs2 configure a second relay LC resonance circuit, and a power receiving coil (inductance) Ls3 and a capacitor Cs3 configure a third relay LC resonance circuit.

As described above, by disposing the plurality of resonators so as to form electromagnetic field resonance coupling including the plurality of resonators, in which the resonators are disposed at predetermined intervals, power can be supplied to a further distanced place. In addition, the power can be supplied in a long distance with high power transmission efficiency.

Nineteenth Embodiment

Figure 22:
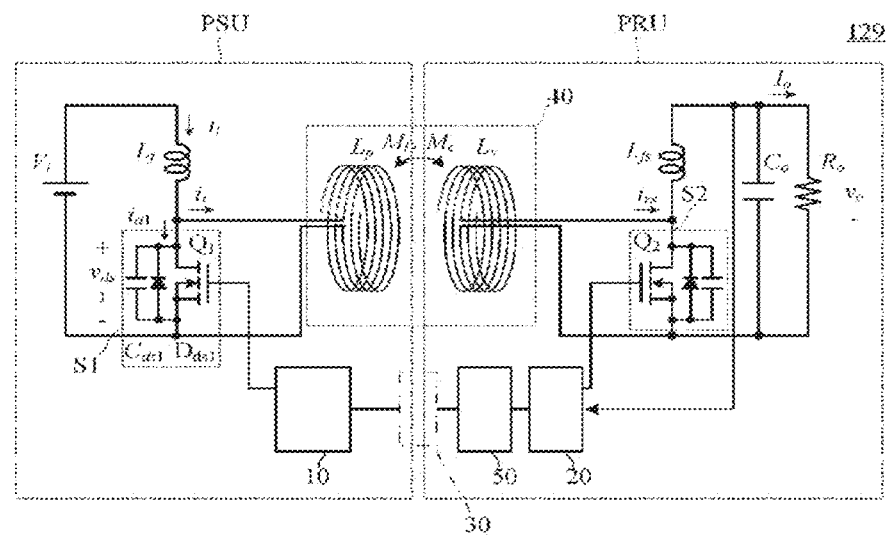
FIG. 22 is a circuit diagram of a power transmission system 129 according to a nineteenth embodiment.

FIG. 22 is a circuit diagram of a power transmission system 129 according to a nineteenth embodiment. In this example, helical coils are used for the power transmitting coil Lp and the power receiving coil Ls, and central power feeding is made in each coil. Accordingly, the helical coil on the power transmitting unit side has equivalent inductance L (Lp) and equivalent capacitance C (Lp) to form a resonance circuit. Likewise, the helical coil on the power receiving unit side has inductance L (Ls) and capacitance C (Ls) to form a resonance circuit. Because the winding axes of the two helical coils are substantially aligned in line (substantially the same axis), an electromagnetic field resonance coupling circuit is formed between the helical coils. The other constituent elements are the same as those described in the first embodiment.

In this manner, using the helical coils with the central power feeding makes it possible to transmit the power mainly by magnetic field resonance coupling.

Twentieth Embodiment

Figure 23:
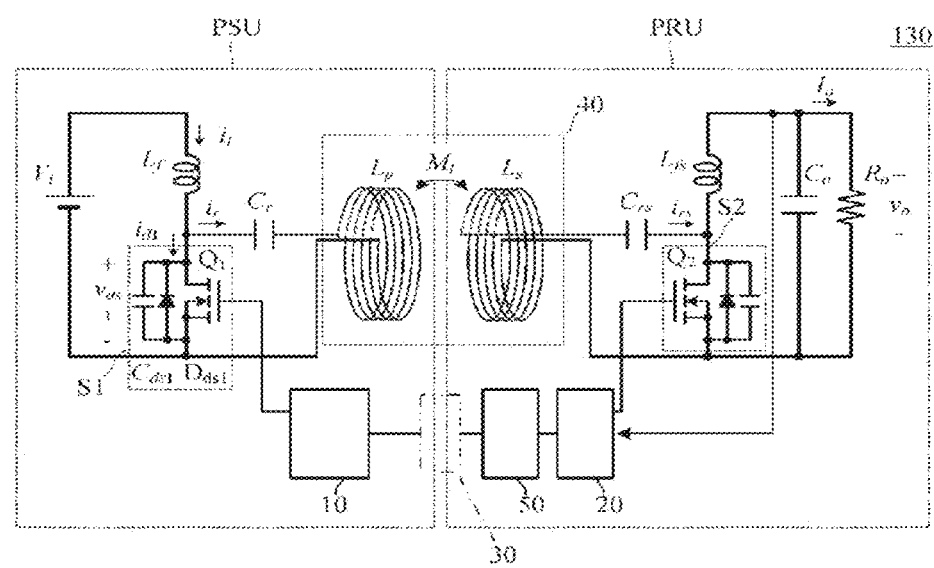
FIG. 23 is a circuit diagram of a power transmission system 130 according to a twentieth embodiment.

FIG. 23 is a circuit diagram of a power transmission system 130 according to a twentieth embodiment. In this example, helical coils are used for the power transmitting coil Lp and the power receiving coil Ls. The resonance capacitor Cr is provided on the power transmitting unit side, while on the power receiving unit side, there is provided the resonance capacitor Crs. Accordingly, the capacitor Cr and the inductance L (Lp) of the power transmitting coil Lp configured by the helical coil on the power transmitting unit side form a resonance circuit. Likewise, the resonance capacitor Crs and the inductance L (Ls) of the power receiving coil configured by the helical coil on the power receiving unit side form a resonance circuit. Because the winding axes of the two helical coils are substantially aligned in line (substantially the same axis), a magnetic field resonance coupling circuit is formed between the helical coils. The other constituent elements are the same as those described in the first embodiment.

As described above, by using the helical coils, power can be transmitted mainly through magnetic field resonance coupling.

Twenty-First Embodiment

Figure 24:
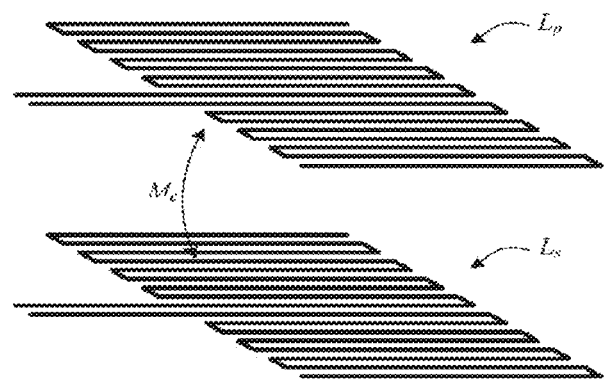
FIG. 24 illustrates an example of a power transmitting coil and a power receiving coil used in a power transmission system according to a twenty-first embodiment.

FIG. 24 illustrates an example of a power transmitting coil and a power receiving coil used in a power transmission system according to a twenty-first embodiment. In this example, meander line coils are used for the power transmitting coil Lp and the power receiving coil Ls, respectively; and the central power feeding is made in each coil. Accordingly, the power transmitting coil Lp has equivalent inductance L (Lp) and equivalent capacitance C (Lp) to form a resonance circuit. Likewise, the power receiving coil Ls has inductance L (Ls) and capacitance C (Ls) to form a resonance circuit. These two coils mainly form electric field resonance coupling. Using the power transmitting coil Lp and the power receiving coil Ls makes it possible to transmit the power mainly through electric field resonance coupling.

Mainly the inductance of the meander line coil may be used by connecting both ends of the meander line coil to a circuit. In other words, the power transmission system may be configured such that the power transmitting coil Lp and the power receiving coil Ls are connected in the same manner as in the example shown in FIG. 23.

Twenty-Second Embodiment

In a twenty-second embodiment, described is a relationship between the switching frequencies and the resonant frequencies on the power transmitting unit side and the power receiving unit side.

The circuit configuration in the present embodiment is the same as that shown in FIG. 1, for example. By setting the switching frequency to a value slightly higher than the resonance frequency at which reactance of the electromagnetic field resonance coupling circuit including the load connected to the power receiving circuit becomes 0, impedance of the electromagnetic field resonance coupling circuit including the load becomes inductive reactance. A current (ir) that flows into the electromagnetic resonance coupling circuit is delayed in phase with respect to the fundamental wave of the voltage (vds1) of the switching element. Immediately before the switching element (Q1) is turned on, the reverse-direction diode connected in parallel to the switching element (Q1) becomes conductive and the ZVS operation is realized.

Figure 25:
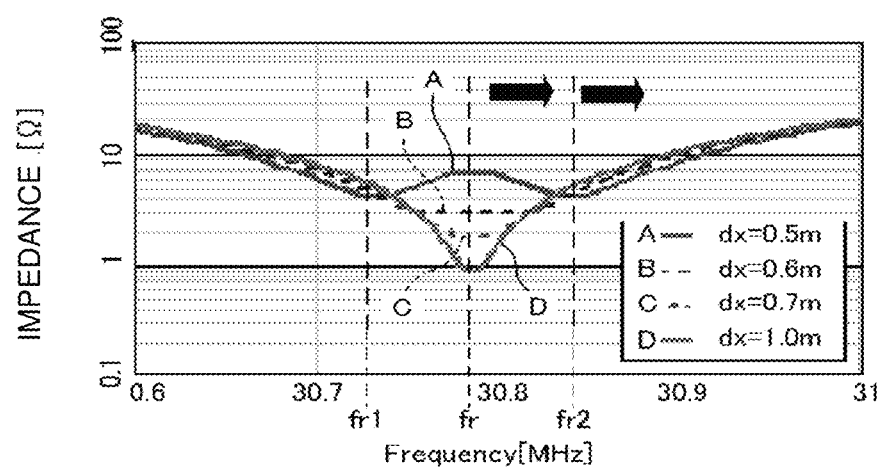
FIG. 25 is a diagram illustrating frequency characteristics of impedance of an electromagnetic field resonance coupling circuit including a load, in a power transmission system according to a twenty-second embodiment.

FIG. 25 is a diagram illustrating frequency characteristics of impedance of an electromagnetic field resonance coupling circuit including a load. In this example, a resonant frequency "fo" of the resonance circuit on the power transmitting unit side and of the resonance circuit on the power receiving unit side is 30.78 MHz. In FIG. 25, in the case where a distance between the power transmitting coil and the power receiving coil is taken as "dx", when dx=0.5 m, the resonant frequency is split to be in a state of double resonance (bimodality) because the degree of coupling of the two resonance circuits is large. For example, in a frequency range which is higher than a higher frequency fr2 of the two resonant frequencies, because the impedance of the electromagnetic field resonance coupling circuit including the load becomes inductive reactance, this frequency band is adopted. Meanwhile, for example, in a frequency range which is higher than a lower frequency fr1 of the two resonant frequencies and lower than a natural resonant frequency fr, because the impedance of the electromagnetic field resonance coupling circuit including the load becomes inductive reactance, this frequency band is adopted. In the case where dx=0.6 m or more, in a frequency range higher than the frequency fr, because the impedance of the electromagnetic field resonance coupling circuit including the load becomes inductive reactance, this frequency band is adopted.

Figure 26:
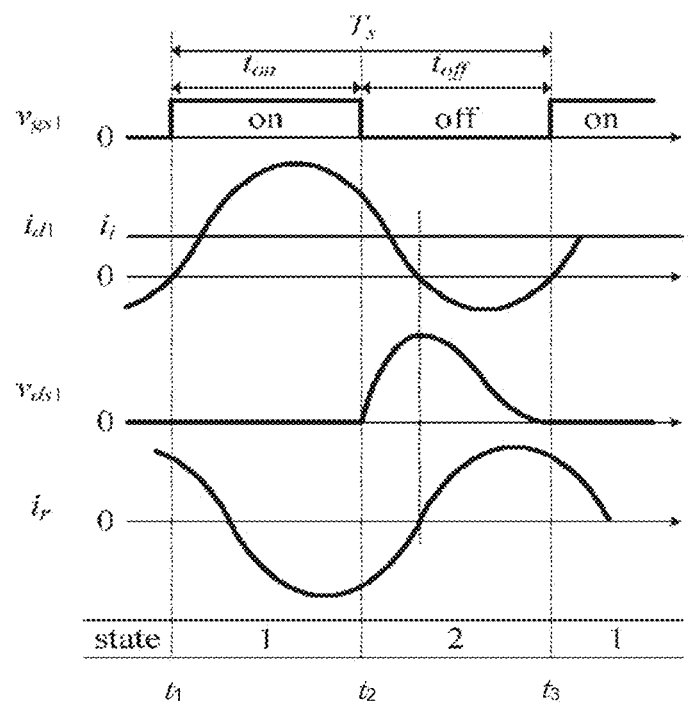
FIG. 26 is a diagram illustrating voltage and current waveforms at the corresponding portions in a power transmission system according to the twenty-second embodiment.

FIG. 26 is a diagram illustrating voltage and current waveforms at the corresponding portions in the power transmission system according to the present embodiment. The circuit configuration of the system is the same as that shown in FIG. 1 of the first embodiment. Hereinafter, operations in the respective states of switching period will be described with reference to FIG. 26.

State 1: Time t1 to t2

On the power transmitting unit side, the switching element Q1 is conductive, and the current id1 starts flowing from 0 ampere and becomes a positive current. A resonance current flows in the power transmitting coil Lp and the resonance capacitor Cr; a resonance current also flows in the power receiving coil Ls and the resonance capacitor Crs.

On the power receiving unit side, the resonance current is rectified by the synchronous rectification switching element Q2, and the rectified and smoothed current is supplied to the load so as to transmit the power. The system goes to State 2 when the switching element Q1 is turned off.

State 2: Time t2 to t3

The capacitor Cds1 on both the ends of the switching element Q1 starts to resonate, is charged first, and is discharged when having exceeded the peak voltage. The voltage vds1 gradually comes closer to 0 volt, and State 2 ends when the switching element Q1 is turned on.

Hereinafter, States 1 through 2 are periodically repeated.

As described above, different from the example shown in FIG. 2, the voltage vds1 comes close to 0 volt immediately before the switching element Q1 is turned on; a current id1 starts flowing from 0 ampere at this turn-on timing. With the switching element Q1 performing the ZVS operation, switching loss and switching noise can be significantly reduced. In addition, because the diode Dds1 of the switching circuit S1 does not become conductive, conductive loss is also reduced.

The invention claimed is:

1. A power transmission system comprising:
a power transmitting unit having a power transmitting coil; and
a power receiving unit having a power receiving coil,
the power transmitting unit including:
a power transmitting unit-side resonance capacitor configuring a power transmitting unit-side resonance circuit along with the power transmitting coil; and a power transmitting unit-side alternating current generation circuit electrically connected with the power transmitting coil, including a switching circuit configured of a parallel connection circuit in which a switching element, a diode, and a capacitor are connected in parallel, and an inductor having a value of inductance making it possible to form a current source, from an inputted direct-current voltage, taken as a direct current in comparison with an alternating current that is flowed in the power transmitting coil, so as to generate the alternating current to be flowed in the power transmitting coil,
the power receiving unit including:
a power receiving unit-side resonance capacitor configuring a power receiving unit-side resonance circuit along with the power receiving coil; and
a power receiving unit-side rectification circuit connected with the power receiving coil and rectifying an alternating current generated on the power receiving coil,
an electromagnetic field resonance coupling circuit configured with mutual inductance and mutual capacitance being equivalently formed between the power transmitting coil and the power receiving coil so that the power transmitting unit-side resonance circuit and the power receiving unit-side resonance circuit resonate with each other to transmit power from the power transmitting unit to the power receiving unit,
energy that is reflected without being transmitted from the power transmitting unit being taken as reactive power and reserved as resonance energy in the power transmitting unit-side resonance circuit, and
of the energy received by the power receiving unit, energy that is reflected without being supplied to output is taken as reactive power and reserved as resonance energy in the power receiving unit-side resonance circuit.

2. A power transmission system comprising:
a power transmitting unit having a power transmitting coil; and
a power receiving unit having a power receiving coil,
the power transmitting unit including:
a power transmitting unit-side resonance capacitor configuring a power transmitting unit-side resonance circuit along with the power transmitting coil; and a power transmitting unit-side alternating current generation circuit electrically connected with the power transmitting coil, including a switching circuit configured of a parallel connection circuit in which a switching element, a diode, and a capacitor are connected in parallel, and an inductor having a value of inductance making it possible to form a current source, from an inputted direct-current voltage, taken as a direct current in comparison with an alternating current that is flowed in the power transmitting coil, so as to generate the alternating current to be flowed in the power transmitting coil,
the power receiving unit including:
a power receiving unit-side resonance capacitor that configures a power receiving unit-side resonance circuit along with the power receiving coil; and
a power receiving unit-side rectification circuit connected with the power receiving coil and rectifying an alternating current generated on the power receiving coil,
a magnetic field resonance coupling circuit configured with mutual inductance being equivalently formed between the power transmitting coil and the power receiving coil so that the power transmitting unit-side resonance circuit and the power receiving unit-side resonance circuit resonate with each other to transmit power from the power transmitting unit to the power receiving unit,
energy that is reflected without being transmitted from the power transmitting unit being taken as reactive power and reserved as resonance energy in the power transmitting unit-side resonance circuit, and
of the energy received by the power receiving unit, energy that is reflected without being supplied to output is taken as reactive power and reserved as resonance energy in the power receiving unit-side resonance circuit.

3. A power transmission system comprising:
a power transmitting unit having a power transmitting coil; and
a power receiving unit having a power receiving coil,
the power transmitting unit:
a power transmitting unit-side resonance inductor configuring a power transmitting unit-side resonance circuit along with a power transmitting unit-side resonance capacitor; and
a power transmitting unit-side alternating current generation circuit electrically connected with the power transmitting coil, including a switching circuit configured of a parallel connection circuit in which a switching element, a diode, and a capacitor are connected in parallel, and an inductor having a value of inductance making it possible to form a current source, from an inputted direct-current voltage, taken as a direct current in comparison with an alternating current that is flowed in the power transmitting coil, so as to generate the alternating current to be flowed in the power transmitting coil,
the power receiving unit including:
a power receiving unit-side resonance inductor configuring a power receiving unit-side resonance circuit along with a power receiving unit-side capacitor; and
a power receiving unit-side rectification circuit connected with the power receiving coil and rectifying an alternating current generated on the power receiving coil,
an electric field resonance coupling circuit configured with mutual capacitance being equivalently formed between the power transmitting coil and the power receiving coil so that the power transmitting unit-side resonance circuit and the power receiving unit-side resonance circuit resonate with each other to transmit power from the power transmitting unit to the power receiving unit,
energy that is reflected without being transmitted from the power transmitting unit being taken as reactive power and reserved as resonance energy in the power transmitting unit-side resonance circuit, and of the energy received by the power receiving unit, energy that is reflected without being supplied to output is taken as reactive power and reserved as resonance energy in the power receiving unit-side resonance circuit.

4. The power transmission system according to claim 1, wherein the power receiving unit includes an information transmitting circuit configured to detect output information of the power receiving unit-side rectification circuit and transmit the output information having been detected to the power transmitting unit side, and the power transmitting unit includes an output information receiving circuit configured to receive the output information and a transmission power control circuit configured to control the transmission power through controlling the power transmitting unit-side alternating current generation circuit in accordance with the output information.

5. The power transmission system according to claim 4, wherein the information transmitting circuit is a circuit that transmits the output information by wireless communication, and the output information receiving circuit is a circuit that receives the output information by wireless communication.

6. The power transmission system according to claim 4, wherein the information transmitting circuit is a circuit that converts an electric signal to an optical signal so as to transmit the output information, and the output information receiving circuit is a circuit that converts an optical signal to an electric signal so as to receive the output information.

7. The power transmission system according to claim 1, wherein the power transmitting unit-side alternating current generation circuit is configured to control transmission power using frequency control PFM (pulse frequency modulation) in which a switching frequency for turning on/off a switching circuit is changed.

8. The power transmission system according to claim 1, wherein the power transmitting unit-side alternating current generation circuit is configured to control transmission power using PWM (pulse width modulation) in which a time ratio is controlled by turning on/off a switching circuit at a fixed switching frequency.

9. The power transmission system according to claim 1, wherein the power receiving unit-side rectification circuit is a synchronous rectification circuit including a switching element.

10. The power transmission system according to claim 9, wherein the power receiving unit includes an operation frequency control circuit for controlling an operation frequency of the synchronous rectification circuit, and is configured to control reception power with the operation frequency.

11. The power transmission system according to claim 1, wherein the power receiving unit includes a control circuit for controlling a circuit of the power receiving unit side, and the control circuit is configured to operate using power that the power receiving unit has received.

12. The power transmission system according to claim 1, wherein, when power is transmitted from an output section of the power receiving unit-side rectification circuit, the power receiving unit-side rectification circuit acts as the power transmitting unit-side alternating current generation circuit while the power transmitting unit-side alternating current generation circuit acts as the power receiving unit-side rectification circuit, thereby making it possible to transmit power bi-directionally.

13. The power transmission system according to claim 1, wherein a resonance capacitor is provided in parallel with respect to the power transmitting coil or the power receiving coil.

14. The power transmission system according to claim 13, wherein the resonance capacitor is configured with stray capacitance that is made to become equivalent capacitance by electric field resonance formed between the power transmitting coil and the power receiving coil.

15. The power transmission system according to claim 13, wherein the resonance capacitor is configured with equivalent mutual capacitance formed between the power transmitting coil and the power receiving coil.

16. The power transmission system according to claim 1, wherein the power transmitting coil and the power receiving coil are air-core inductors.

17. The power transmission system according to claim 1, wherein the mutual inductance is equivalent magnetization inductance generated by magnetic field resonance coupling which is formed between the power transmitting coil and the power receiving coil.

18. The power transmission system according to claim 1, wherein, of inductance components of the power transmitting coil or the power receiving coil, leakage inductance that is not related to resonance coupling is used as an inductor which configures the power transmitting unit-side resonance circuit or the power receiving unit-side resonance circuit.

19. The power transmission system according to claim 1, wherein the power transmitting unit-side alternating current generation circuit includes a plurality of the power transmitting coils and a plurality of the switching circuits, the power transmitting coils and the switching circuits are configured to be electrically connected with each other, and the plurality of switching circuits sequentially perform switching operation in a periodic manner.

20. The power transmission system according to claim 1, wherein the power transmitting unit-side alternating current generation circuit includes the plurality of switching circuits, the plurality of switching circuits are configured to be electrically connected with the power transmitting coils, and the plurality of switching circuits sequentially perform the switching operation in a periodic manner.

* * * * *